United States Patent Office 3,025,324
Patented Mar. 13, 1962

3,025,324
BIS(N-SUBSTITUTED-N-TRIFLUOROMETHYL-AMINO)SULFIDES
Travis E. Stevens, Huntsville, Ala., assignor to Rohm & Haas Company, Philadelphia, Pa., a corporation of Delaware
No Drawing. Filed Apr. 12, 1960, Ser. No. 21,582
5 Claims. (Cl. 260—576)

This invention concerns bis(N-substituted-N-trifluoromethyl) aminosulfides and the method of preparing such compounds. The compounds are of the general Formula I:

in which R is selected from the group consisting of aryl and substituted aryl, alkyl, lower aralkyl and cycloalkyl. It has been found that compounds of the type shown in the formula above can be prepared by reacting a substituted isothiocyanate of the general formula

RNCS in which R is as hereinbefore set forth, with iodine pentafluoride ($IF_5$). It is also possible to make the compounds of the present invention by heating isonitriles and formamides with $IF_5$ in the presence of sulfur. However, since it is known that formamides will dehydrate to form isonitriles and that isonitriles react with sulfur to form isothiocyanates, the reactions are substantially the same.

The compounds of this invention are of value as fungicides as shown by the test data on two representative examples, compound 0-4326, bis(N-p-chlorophenyl-N-trifluoromethyl)aminosulfide and compound 0-4327, bis (N-p-tolyl-N-trifluoromethyl)aminosulfide. Slide spore germination tests were run on *Stemphylium sarcinaeforme* (May). The figures in the following table are percent inhibition of the spores:

| Compound | Concentration (p.p.m.) | | | | |
|---|---|---|---|---|---|
| | 1,000 | 200 | 50 | 10 | 1 |
| 0-4326 | 100 | 100 | 83 | 83 | 63 |
| 0-4327 | 100 | 70 | 62 | 34 | 38 |

Compound 0-4326 also showed an $ED_{50}$ of about 50 p.p.m. on *Alternaria solani*.

Compound 0-4326, at an application rate of 10 pounds per acre, showed good post-emergence herbicidal activity on such plants as Indian Mallow, millet, and curly dock.

The compounds of the present invention can be prepared by reacting substituted isothiocyanates with $IF_5$ with or without a solvent which does not react with $IF_5$. It is not preferred to run without a solvent, since the reaction mixtures so obtained are more difficult to purify. Pyridine can be used alone as a solvent and also functions as a halide acceptor. If there is present one mole of pyridine per mole of $IF_5$, then other solvents which are non-reactive with $IF_5$ can be employed. Chlorinated hydrocarbons appear to be particularly suitable and include methylene chloride, ethylene dichloride, chloroform, etc. Dimethylformamide and acetonitrile were also suitable as solvents.

Typical suitable substituted isothiocyanates include alkyl substituted isothiocyanates, including ethyl, butyl, heptyl, t-octyl, octadecyl, aryl and aryl-substituted isothiocyanates including phenyl, tolyl, halogen substituted aryls, aralkyl, such as phenylethyl, nitro and acetylphenyl-substituted isothiocyanates. Cyclohexyl isothiocyanate was also successfully used. When employing sulfur with $IF_5$, octadecyl isonitrile was employed successfully.

The molar ratio of the isothiocyanate to the $IF_5$ can be from 1 to 1 to about 1 to 5. A slight excess of the $IF_5$ is generally employed so as to obtain maximum yield of the product. Thus, one mole isothiocyanate is used with about 1.1 to about 1.2 moles of $IF_5$. Although higher excesses of $IF_5$ may be employed, they are not generally desirable. The preferred method employs the addition of the $IF_5$ to a solution of the isothiocyanate, but the reverse order of addition can also be employed.

The reaction temperature used will vary somewhat, depending on the nature of the isothiocyanate. The temperatures used varied from about 40° C. to about 150° C., and, with a few exceptions, the reaction products were not sensitive to higher reaction temperatures or excesses of $IF_5$. Two such exceptions were noted with p-acetylphenyl and p-nitrophenyl isothiocyanates in which cases it was necessary to use a 1 to 1 molar ratio of isothiocyanate to $IF_5$ and a temperature in the range of 60° to 75° C. in order to avoid polymer and tar formation. For aryl and substituted aryl isothiocyanates, a temperature range of 75° to 85° C. is preferred. For alkyl isothiocyanates, a temperature range of 95° to 110° C. is preferred.

Because of the rapid hydrolysis of iodine pentafluoride, the reactions were conducted under anhydrous conditions, although no unusual precautions against moisture were taken. The aminosulfides, however, were not moisture sensitive. Excess iodine pentafluoride or other fluorinated materials present in the reaction mixture were hydrolyzed with ice water, and the aminosulfide extracted and recrystallized from aqueous ethanol or hexane.

The structure of the aminosulfides was established by the analytical data given in Table I and by the hydrolytic experiments and spectral data given hereinafter.

The $F^{19}$ n.m.r. spectra of several of the aminosulfides were obtained using a Varian Associates Model No. V-4300 B spectrometer with a 40 mc. probe. For the aminosulfide I, R=p-bromophenyl, only a single peak, attributable to a $CF_3$ group, was observed at 927 cycles lower field than trifluoroacetic acid: in I, R=n-butyl, this resonance occurred at −760 cycles. The p-fluorophenyl compound I exhibited resonance at −892 cycles due to the $CF_3$ group and at +1412 cycles due to the aromatic fluorine atom.

Hydrolysis of the aminosulfides I with aqueous ethanolic sodium hydroxide at room temperature for four hours resulted in the quantitative liberation of fluoride ion. The organic products of this hydrolysis, in the case of I, R=p-bromophenyl, were p-bromoaniline (53%) and p-bromophenyl urethan (33%). Similarly, I, R=p-chlorophenyl, yielded p-chloroaniline (51%) and p-chlorophenyl urethan (23%). Hydrolysis with an ethanol-water-hydrochloric acid mixture gave the same products.

TABLE I

Bis-(N-Substituted-N-Trifluoromethyl) Aminosulfides $$\begin{array}{ccc} CF_3 & & CF_3 \\ | & & | \\ R-N-S-N-R \end{array}$$

| R | M.P.(B.P.), °C. | Yield [1] | Analysis Calc'd | | | Analysis Found | | |
|---|---|---|---|---|---|---|---|---|
| | | | C | H | N | C | H | N |
| Phenyl | 54 | ([2]) | 47.73 | 2.86 | 7.95 | 47.87 | 3.05 | 7.81 |
| p-Fluorophenyl | 33 | 90 | 43.30 | 2.08 | 7.22 | 43.41 | 2.30 | 7.53 |
| p-Chlorophenyl | 56 | 94 | 39.92 | 1.91 | 6.65 | 39.88 | 2.00 | 6.99 |
| p-Bromophenyl [3] | 70 | 97 | 32.96 | 1.58 | 5.49 | 32.68 | 1.76 | 5.46 |
| p-Iodophenyl | 104 | 88 | 27.83 | 1.33 | 4.64 | 27.96 | 1.54 | 4.82 |
| p-Tolyl [4] | 59 | 91 | 50.52 | 3.71 | 7.37 | 50.52 | 3.83 | 7.60 |
| m-Bromophenyl | (125/0.5mm.) | 90 | 32.96 | 1.58 | 5.49 | 32.78 | 1.92 | 5.47 |
| Ethyl | (44/30mm.) | 42 | 28.12 | 3.92 | 10.94 | 28.54 | 4.36 | 11.34 |
| Butyl [5] | (80/12 mm.) | 72 | 38.45 | 5.81 | 8.97 | 38.71 | 5.95 | 8.58 |
| 1-phenylethyl | (128/0.4 mm.) | 25 | 52.93 | 4.44 | 6.86 | 52.97 | 4.45 | 7.27 |
| p-Nitrophenyl [6] | 122 | 55 | 38.01 | 1.82 | 12.67 | 37.09 | 1.95 | 12.75 |
| p-Acetylphenyl [7] | 92 | 55 | 49.54 | 3.23 | 6.42 | 48.65 | 3.24 | 6.56 |
| Dodecyl | ([8]) | ca. 80 | 58.18 | 9.39 | 5.22 | 58.62 | 9.23 | 5.47 |

[1] For the aryl series this is a crude yield, recrystallization was necessary to obtain M.P. recorded here: for the alkyl series the yield of distilled, pure product is reported.
[2] Not completely separated from the p-iodophenyl compound also obtained in the phenyl isothiocyanate reaction.
[3] Also found: F, 22.0; S, 6.59; MW, 471.
[4] Also found: F, 29.6.
[5] Also found: S, 9.40.
[6] Also found: F, 25.88.
[7] Also found: F, 26.04.
[8] Sample not distilled.

The following examples set forth certain well-defined embodiments of the application of this invention. They are not, however, to be considered as limitations thereof, since many modifications may be made without departing from the spirit and scope of this invention.

Unless otherwise specified, all parts are by weight. All temperatures are centigrade unless otherwise noted.

EXAMPLE I

*Reaction of p-Chlorophenyl Isothiocyanate and Iodine Pentafluoride in Pyridine*

A mixture of 35 ml. of pyridine and 8.86 grams (0.052 mole) of p-chlorophenyl isothiocyanate was warmed to 65° and the dropwise addition of iodine pentafluoride (4.0 ml., 0.057 mole) was carried out so as to maintain a reaction temperature of 75° to 80° C. The solution gradually darkened and when about one-half of the iodine pentafluoride has been added a more exothermic reaction occurred; the solution then was only slightly discolored. After the iodine pentafluoride had been added, the solution was stirred at 80° for ten minutes. The mixture was then poured over crushed ice and extracted with methylene chloride. When the methylene chloride solution had been washed with water, 10% hydrochloric acid and 15% sodium thiosulfate solution, it was dried (magnesium sulfate) and concentrated to 30 ml. This methylene chloride solution was placed on a 1 x 6 in. silica gel column and eluted with 250 ml. of pentane:methylene chloride (1:1). The solid residue obtained on evaporation of this solvent 10.3 grams (94%) was recrystallized from ethanol water to give bis(N-p-chlorophenyl-N-trifluoromethyl)aminosulfide, 6.52 grams, M.P. 55–56° C.

A somewhat more convenient method of purifying the aminosulfide often was used. The methylene chloride extract was evaporated to dryness, the residue was extracted with a small amount of petroleum ether and filtered. The filtrate then either was reduced in volume and chilled to obtain the aminosulfide, or the filtrate was evaporated and the residual aminosulfide was recrystallized from ethanol. In most cases the aminosulfide, in a sufficiently high degree of purity, was obtained after the petroleum ether extraction.

EXAMPLE II

*Reaction of p-Bromophenyl Isothiocyanate and Excess Iodine Pentafluoride in Pyridine*

A stirred solution of 3.0 grams (0.014 mole) of p-bromophenyl isothiocyanate in 30 ml. of pyridine was warmed to 85° C. by means of a steam bath, and 3.0 ml. (0.042 mole) of iodine pentafluoride was added dropwise. There was a slight exotherm of the reaction mixture on the addition of the pentafluoride (in some runs with other isothiocyanates an exotherm to over 100° would occur if not controlled by external cooling). The mixture was heated on the steam bath for fifteen minutes when the addition was complete. When the mixture had cooled hydrolysis was accomplished by the addition of 100 grams of crushed ice; this was followed by extraction with methylene chloride. The methylene chloride extract was washed with water, 10% hydrochloric acid, and enough dilute sodium thiosulfate solution to remove the iodine color from the organic extract. Removal of the methylene chloride at reduced pressure left an oily residue which was taken up in pentane and filtered to remove 0.04 gram of solid. Evaporation of the pentane yielded bis-(N-p-bromophenyl-N-trifluoro-methyl)aminosulfide, 3.48 grams (97%) as an oil which solidified on scratching, M.P. 62° to 64° C. After three recrystallizations from a small amount of ethanol, there was obtained 2.48 grams (69%) of product melting at 69° to 70° C.

EXAMPLE III

*Reaction of Phenyl Isothiocyanate and Iodine Pentafluoride in Pyridine*

To a solution of 11.4 grams (0.084 mole) of phenyl isothiocyanate in 100 ml. of pyridine was added 7.0 ml. (0.10 mole) of iodine pentafluoride; the procedure described in Example II for p-bromophenyl isothiocyanate was followed, but the residue obtained from the pentane extract was distilled through the Holzman column. There was collected, after a small forerun, 2.88 grams of distillate, B.P. 88° to 90° C. (1 mm.). Distillation was then discontinued. The distillate, after two recrystallizations from ethanol, afforded bis-(N-phenyl-N-trifluoromethyl) aminosulfide, 1.49 grams, M.P. 53° to 54° C. Molecular weight: calculated 352; found 347.

A pentane extract of the pot residue was evaporated to dryness and recrystallized from ethanol. Thus, bis-(N-p-iodophenyl-N-trifluoromethyl) - aminosulfide, 1.12 grams, M.P. 104° to 105° C. was obtained. Comparison of infrared spectra and a mixed M.P. determination established that this material was identical with the product of the p-iodophenyl isothiocyanate-iodine pentafluoride reaction. The infrared spectrum of the residual oil remaining after the isolation of the above samples indicated that the oil was a mixture of these two compounds. The presence of a mixed isomer (an N-phenyl-N'-p-iodophenyl amino sulfide) could not be excluded.

EXAMPLE IV

*Butyl Isothiocyanate and Iodine Pentafluoride*

A mixture of 8.1 grams (0.070 mole) of n-butyl isothiocyanate and 40 m. of pyridine was stirred at 85° to 95° C. while 5.0 ml. (0.071 mole) of iodine pentafluoride was added slowly. The solution was heated at 110° for four hours, cooled and poured on ice. The methylene chloride extract of the hydrolyzate was concentrated to 25 ml., passed through a short silica gel column with methylene chloride pentane (1:1) and distilled in the Holzman column. There was obtained bis-(N-n-butyl-N-trifluoromethyl)-aminosulfide, 7.85 grams (72%), B.P. 80° (12 mm.), $n_D^{20}$ 1.3880.

EXAMPLE V

*Reaction of p-Bromophenyl Isonitrile, Sulfur and Iodine Pentafluoride in Pyridine*

A mixture of 2.55 grams (0.014 mole) of p-bromophenyl isonitrile, 0.20 gram (0.007 mole) of sulfur and 12 ml. of pyridine was warmed to 65° C. and 2.0 ml. (0.028 mole) of iodine pentafluoride was added dropwise. An exothermic reaction, controlled by external cooling and the rate of addition of iodine pentafluoride, occurred. The mixture was stirred at 80° C. for fifteen minutes after the addition. The product was isolated as described above. The residue from the methylene chloride solution was extracted with pentane: a considerable insoluble residue was discarded. Evaporation of the pentane left a residue which was crystallized from ethanol. Initially a gum separated and was discarded. The ethanol solution then deposited 0.53 gram of bis-(N-p-bromophenyl-N-trifluoromethyl)aminosulfide, M.P. 61° to 63° C., mixed M.P. with an authentic specimen (M.P. 68° to 69° C.), 67° to 69° C. The infrared spectrum was identical with that of an authentic specimen.

EXAMPLE VI

*Sulfur, N-n-Butylformamide and Iodine Pentafluoride*

A mixture of 40 ml. of pyridine, 0.73 gram (0.023 mole) of sulfur, and 6.0 ml. (0.084 mole) of iodine pentafluoride was stirred at 85° to 95° C. while 4.7 grams (0.047 mole) of n-butylformamide in 5 ml. of pyridine was added dropwise. After one hour at 115°, the solution was cooled, hydrolyzed, extracted and chromatographed as usual. Distillation gave bis-(N-n-butyl-N-trifluoromethyl)aminosulfide, 1.50 grams (21%) $N_D^{20}$ 1.3892, infrared spectrum identical with that of material prepared from isothiocyanate.

EXAMPLE VII

*n-Butyl Isonitrile, Sulfur and Iodine Pentafluoride*

The procedure outline for n-butylformamide was followed using 3.9 grams (0.047 mole) of n-butyl isonitrile, 0.057 mole of iodine pentafluoride and 0.024 mole of sulfur. After the addition of the isonitrile, the solution was stirred at 93° (steam bath) for 30 minutes, then hydrolyzed and extracted as usual. In this manner, bis-(N-n-butyl-N-trifluoromethyl)aminosulfide, 3.13 grams (43%), B.P. 83° (13 mm.), $n_D^{20}$ 1.3880, was obtained; its infrared spectrum was identical with that of samples prepared previously.

I claim:

1. Aminosulfides of the general formula

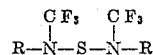

in which R is selected from the group consisting of alkyl, phenyl, phenylalkyl, halogen substituted phenyls and a substituted phenyl selected from the group consisting of p-nitrophenyl, and p-acetylphenyl.

2. A process for the preparation of amino sulfides of the general formula

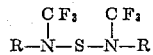

in which R is selected from the group consisting of alkyl, phenyl, phenylalkyl, halogen substituted phenyls and a substituted phenyl selected from the group consisting of p-nitrophenyl, and p-acetylphenyl, which comprises reacting at a temperature of from about 40° C. to about 150° C. and isothiocyanate of the formula

RNCS in which R is as set forth hereinbefore with iodine pentafluoride and recovering the substituted aminosulfide so formed.

3. A process as set forth in claim 2 in which the reaction is conducted under anhydrous conditions.

4. A process as set forth in claim 3 in which the reaction is conducted in a solvent which is inert under the reaction conditions.

5. A process as set forth in claim 4 in which the molar ratio of the isothiocyanate to iodine pentafluoride is from about 1 to about 1.

References Cited in the file of this patent

UNITED STATES PATENTS 2,616,927    Kauck et al.     Nov. 4, 1952

OTHER REFERENCES

Barr et al.: "Jour. Chem. Soc." (London), pages 2532–2533 (1955).